United States Patent [19]

Riman et al.

[11] Patent Number: 5,932,505

[45] Date of Patent: *Aug. 3, 1999

[54] HYDROFLUORIC ACID RESISTANT CERAMIC MORTAR

[75] Inventors: Richard E. Riman, Belle Mead, N.J.; Jakinee Eamsiri, Muang, Thailand; Kurt Richard Mikeska, Wilmington, Del.; Yong Han, Seoul, Rep. of Korea

[73] Assignee: Rutgers, The State University, New Brunswick, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/743,163

[22] Filed: Nov. 4, 1996

[51] Int. Cl.$^6$ .................................................. C04B 35/10
[52] U.S. Cl. .................................. 501/88; 501/94; 501/99; 501/100; 501/127; 501/151
[58] Field of Search ............................. 501/99, 94, 88, 501/127, 100, 151

[56] References Cited

U.S. PATENT DOCUMENTS

| | | | |
|---|---|---|---|
| 3,429,720 | 2/1969 | Houston et al. | 501/151 |
| 4,735,925 | 4/1988 | Kato et al. | 501/151 |
| 4,746,637 | 5/1988 | Kasori et al. | 501/151 |
| 4,806,509 | 2/1989 | Porterfield | 501/151 |
| 5,411,583 | 5/1995 | Bennison et al. | 501/127 |

FOREIGN PATENT DOCUMENTS

| | | | |
|---|---|---|---|
| 7079040 | 5/1982 | Japan . | |
| 0074580 | 5/1983 | Japan | 501/151 |
| 1160862 | 6/1989 | Japan . | |
| 21-141657 | 4/1990 | Japan . | |
| 2111657 | 4/1990 | Japan . | |
| 4012053 | 1/1992 | Japan . | |
| 09025159 | 1/1997 | Japan . | |
| 0565019 | 8/1977 | U.S.S.R. | 501/151 |
| 0649669 | 3/1979 | U.S.S.R. . | |
| 2009135 | 6/1979 | United Kingdom . | |
| 2218711 | 11/1989 | United Kingdom . | |

OTHER PUBLICATIONS

*Introduction to the Principles of Ceramic Processing*, Reed (1988) p. 375.

*Primary Examiner*—Paul Marcantoni
*Attorney, Agent, or Firm*—Synnestvedt & Lechner LLP

[57] ABSTRACT

Hydrofluoric acid-resistant ceramic mortar compositions containing a hydrofluoric acid-resistant grog having a particle size distribution imparting a high particle packing fraction to the mortar composition and a binding phase containing a metal salt having a particle size distribution imparting plasticity to the mortar composition selected from hydrofluoric acid-insoluble fluoride salts, metal salts capable of forming hydrofluoric acid-insoluble fluoride salts upon reaction with a fluorinating reagent and mixtures thereof. Methods for forming hydrofluoric acid-resistant ceramic mortar compositions from non-fluoride metal salts are also disclosed as well as methods for bonding refractory bricks into a brickwork unit with the ceramic mortars of the invention. Brickwork units prepared using the ceramic mortar compositions of the invention by the methods of the invention are also described.

33 Claims, No Drawings

HYDROFLUORIC ACID RESISTANT CERAMIC MORTAR

BACKGROUND OF THE INVENTION

The present invention relates to hydrofluoric acid-resistant ceramic mortars, and in particular to ceramic mortars in which the binding phase contains a metal salt having a particle size distribution imparting plasticity to the mortar that is either hydrofluoric acid-insoluble or is capable of forming a hydrofluoric acid-insoluble fluoride salt upon reaction with a fluorinating reagent. The present invention also relates to methods for forming hydrofluoric acid-resistant ceramic mortars in situ from mortars containing metal salt binding phases that are capable of forming hydrofluoric acid-insoluble fluoride salts upon reaction with fluorinating reagents. The present invention further relates to methods for bonding refractory brick into a brickwork unit using the hydrofluoric acid-resistant mortars of the present invention.

Generally, ceramic mortars contain silicate compounds that can be attacked by hydrofluoric acid (HF). For this reason, it is impossible to use silicate mortars for constructing HF reactors. At lower temperatures, stainless steel or carbon steel reactors with HF-resistant polymer coatings are used. However, at higher temperatures, reactors made of bricks such as carbon-bearing refractory bricks are used. Neither HF-resistant glasses or polymers can be used as a reactor liner because the softening temperatures of these materials are too low, generally between 300° C. and 400° C. Such lining materials may creep, and gases inside the reactor may then permeate through the reactor wall.

A need exists for ceramic mortars that do not contain silicate compounds, but exhibit HF resistance at elevated temperatures.

SUMMARY OF THE INVENTION

This need is met by the present invention. It has now been discovered that ceramic mortars based on an HF-resistant grog and a hydrofluoric acid-insoluble metal fluoride salt exhibit HF-resistance at elevated temperatures. The present invention incorporates the discovery that HF-resistant ceramic mortars may be formed by directly combining the HF-resistant grog with a metal fluoride salt or by forming a metal fluoride salt in situ by combining the hydrofluoric acid-resistant grog with a metal salt that is capable of forming an HF-insoluble fluoride salt upon reaction with a fluorinating reagent and then either adding such a reagent to the mortar or exposing a brickwork unit containing the mortar to such a reagent.

Therefore, according to one embodiment of the present invention, a hydrofluoric acid-resistant ceramic mortar composition is provided containing a hydrofluoric acid-resistant grog having a particle size distribution imparting a high particle packing fraction to the mortar and a binding phase containing a metal salt having a particle size distribution imparting plasticity to the mortar composition selected from hydrofluoric acid insoluble fluoride salts, metal salts capable of forming hydrofluoric acid insoluble fluoride salts upon reaction with a fluorinating reagent and mixtures thereof. The grog and binding phase are combined with an effective amount of an aqueous liquid to form a cementitious paste. For metal salts capable of forming fluoride salts, the aqueous paste-forming liquid may further include a fluorinating reagent so that the fluoride salt is formed prior to application of the mortar.

One aspect of this embodiment of the invention provides mortar compositions that include an HF-resistant polymer such as poly(tetrafluoroethylene) (PTFE) to improve the adherence between mortar and refractory bricks and to reduce permeability of the mortar at high temperature. The HF-resistant polymers function as a viscous sintering vehicle. Refractory bricks bonded with ceramic mortars containing HF-resistant polymers may then be sintered at temperatures at which viscous flow of the mortar will occur, thereby bonding the refractory bricks together through a densification process driven by the reduction of surface energy resulting from the viscous flow of material. The viscous flow of the mortar at sintering temperature thus reduces the porosity of the mortar, and also wicks the mortar into voids in the refractory brick to strengthen the bond between mortar and brick.

In accordance with another embodiment of the present invention, methods are provided for forming HF-resistant ceramic mortars from non-fluoride metal salts that impact plastic properties to the composition and form HF-insoluble fluoride salts upon reaction with fluorinating reagents. Methods in accordance with this embodiment of the present invention include the steps of:

preparing a first ceramic mortar composition containing an HF-resistant grog having a particle size distribution imparting a high particle packing fraction to the mortar composition and a binding phase containing a first metal salt having a particle size distribution imparting plasticity to the mortar composition and capable of forming an HF-insoluble fluoride salt upon reaction with a fluorinating reagent; and contacting the first ceramic mortar composition with a fluorinating reagent capable of reacting with the first metal salt to form an HF-insoluble fluoride salt, so that an HF-insoluble fluoride salt is formed in the mortar binding phase, thereby imparting HF-resistance to the mortar.

As noted above, methods in accordance with one aspect of this embodiment of the present invention may further include the step of forming a cementitious paste of the grog and the binding phase with an effective amount of a paste-forming liquid. This step may be performed before contacting the mortar with the fluorinating reagent. Alternatively, according to another aspect of this embodiment, the fluorinating reagent may be included in the paste-forming liquid, thereby forming an HF-insoluble fluoride salt in the mortar binding phase before application of the mortar. For methods in accordance with this aspect of the present invention, the step of contacting the mortar composition with a fluorinating reagent includes the step of contacting the mortar composition with an effective amount of a fluorinating reagent so that a cementitious paste of the grog and binding phase is formed.

Additionally, according to another aspect of this embodiment of the present invention, mortar compositions may be formed containing HF-resistant polymers functioning as a viscous sintering vehicle. Methods in accordance with this aspect of the present invention include the steps of binding together refractory bricks with the mortar composition to form a brickwork unit, and then sintering the brickwork unit at a temperature at which viscous flow of the HF-resistant polymer will occur, thereby reducing the porosity of the mortar composition and bonding the brickwork unit together.

According to yet another embodiment of the present invention, a method is provided for bonding refractory brick into a brickwork unit with a cement-like paste of the ceramic mortar composition of the present invention. Methods in accordance with this embodiment of the present invention include the step of bonding refractory bricks with a cementitious paste of a first ceramic mortar containing an HF-resistant grog having a particle size distribution imparting a high particle packing fraction to the mortar composition, a binding phase containing a first metal salt having a particle size distribution imparting plasticity to the composition and that is an HF-insoluble fluoride salt or is capable of forming an HF-insoluble fluoride salt upon reaction with a fluorinating reagent, and a paste-forming liquid, present in an amount effective to form a cementitious paste of the grog and the binding phase, so that the refractory bricks form a brickwork unit. The first metal salt may also be a combination of an HF-insoluble fluoride salt and a salt capable of forming an HF-insoluble fluoride salt upon reaction with a fluorinating reagent.

For binding phases containing a metal salt capable of forming an HF-insoluble fluoride salt, according to one aspect of this embodiment of the invention, the paste-forming liquid may include a fluorinating reagent, so that fluorination occurs in the mortar binding phase, thereby imparting HF-resistance to the mortar composition before it is used to bond the refractory bricks into a brickwork unit. According to another aspect of this embodiment of the present invention in which the bonding phase contains a first metal salt capable of forming an HF-insoluble fluoride salt, the method further includes the step of exposing the brickwork unit to a fluorinating reagent capable of reacting with the first metal salt to form an HF-insoluble fluoride salt, so that an HF-insoluble fluoride salt is formed in the mortar of the brickwork unit, thereby imparting HF-resistance thereto. Typically, this will occur during commercial operation of HF reactors lined with brickwork units prepared according to this method of the present invention.

According to another aspect of this embodiment of the invention, mortar compositions containing HF-resistant polymers may be used. The inventive method then further includes the step of sintering the brickwork unit at a temperature at which viscous flow of the polymer will occur, thereby reducing the porosity of the mortar composition bonding the brickwork unit together.

The compositions and methods of the present invention thus permit HF reactors to be constructed using HF-resistant mortars. Therefore, the present invention also includes brickwork units of refractory brick bonded together by the mortar compositions of the present invention by the methods of the present invention. The mortars can be prepared with a HF-resistant binding phase, or materials can be used that render the mortar HF-resistance upon exposure of the mortar to HF during commercial operation of the reactor.

DETAILED DESCRIPTION OF THE PREFERRED EMBODIMENT

Mortar compositions typically consist of a grog and a binding phase. The mortar compositions of the present invention use grog materials having good HF durability. Essentially any HF-resistant material having a particle size distribution suitable for use as a grog material may be employed. Suitable grog materials include silicon carbide (SiC), alumina ($Al_2O_3$), carbon grog (a form of graphite), and the like. Crushed refractory brick may be used as well, and in fact, is preferred, because it has the same HF-resistance as the refractory brick to be bound by the mortar compositions of the present invention into a brickwork unit. HF-insoluble metal salts such as calcium fluoride ($CaF_2$) and materials capable of forming HF-insoluble salts upon exposure to a fluorinating reagent may also be used.

The particle size distribution of the grog is selected to optimize the a high particle packing fraction of the mortar, thereby maximizing the strength of the bond between the mortar and the refractory brick. This will vary somewhat depending upon the type of grog, but can be readily identified by one of ordinary skill in the art. For example, SiC is typically available in a 10 μm particle size, which is acceptable for purposes of the present invention. Similarly, carbon grog is available in a 10 μm particle size, which is also acceptable. Refractory brick should be crushed and sieved to a particle size between about 125 and about 840 μm. This is accomplished by sequentially passing the crushed refractory brick through a series of sieves ranging from 20 mesh up to 60 mesh. A refractory brick particle size between about 250 and about 710 μm is preferred.

The binding phase will include either an HF-insoluble fluoride salt, a metal salt capable of forming an HF-insoluble fluoride salt upon reaction with a fluorinating reagent or a mixture thereof. Either way, the particle size distribution of the metal salt of the binding phase must impart plasticity to the mortar. Typically, this requires a fine particle size, which imparts the requisite rheological properties to the mortar composition, namely a shape-forming capability conducive to gap-filling between refractory bricks, as well as to the formation of uniform linings on vertical brickwork units without sagging or creeping.

Plasticity is the rheological property defining the degree to which a solid or semi-solid material will flow or deform under applied stress and retain the shape so induced, either permanently or for a definite time interval. At stresses less than the yield stress ($\sigma_x$), the material cannot flow. Thus, mortars with sufficient plasticity will deform and spread over a brick surface when applied with stress greater than $\sigma_x$ but remain in its final shape when the stress is relieved. At stresses beyond $\sigma_x$, the rheology should be Newtonian, pseudoplastic or thixotropic, but not dilatent. This facilitates easy (low shear stress) application of the mortar.

The preferred metal salts of the binding phase include metal fluorides and metal salts capable of forming metal fluorides upon reaction with a fluorinating reagent. $CaF_2$ is the preferred metal fluoride, while gypsum ($CaSO_4.0.5H_2O$) is the preferred metal salt capable of forming an HF-insoluble fluoride salt, namely $CaF_2$. Other metal fluorides with low solubility in HF are suitable for use in the present invention and can be readily identified by those of ordinary skill in the art without undue experimentation. Examples of suitable fluoride-forming metal salts include $CaCl_2$, $CaCO_3$, $CaSO_4$, and the like.

HF-insoluble metal fluoride salts and metal salts capable of forming HF-insoluble fluoride salts upon reaction with a fluorinating reagent can be employed as both grog and binder, but must contain a suitable particle size distribution imparting both thea high particle packing fraction of the grog and the plasticity of the binder. Suitable particle size distributions can be readily determined by those of ordinary skill in the art without undue experimentation.

When an HF-insoluble fluoride salt such as $CaF_2$ is used as the binder, mortar compositions in accordance with the present invention are prepared by combining the HF-resistant grog and HF-insoluble fluoride salt with a paste-forming liquid such as water, an alcohol or a carboxylic acid such as acetic acid or mixtures thereof in an amount effective to form a cementitious paste. For an alcohol or carboxylic acid to be suitable for use at room temperature, the material must be liquid at room temperature.

Aqueous solutions of the alcohol or carboxylic acid may be used, if the alcohol or acid are water-soluble. However, the alcohol or carboxylic acid need not be water-soluble or even support the HF-insoluble species, but could instead support the fluorinating reagent to promote the reaction with the insoluble species. The paste-forming liquid should solubilize a fluorinating reagent, or be a fluorinating reagent in itself.

The weight ratio of grog to HF-insoluble fluoride salt should range between about 1:2.5 and about 1:1, and preferably between about 1:2 and 1:1.1. The grog-HF-insoluble fluoride salt combination should be combined with between about 15% and about 50% by weight, and preferably between about 24% and about 40% by weight of the paste-forming liquid. The material can then be used as a mortar to cement together refractory bricks to from brickwork unit linings for HF reactors.

Alternatively, the HF-insoluble fluoride salt can be replaced with a metal salt such as gypsum ($CaSO_4$), capable of forming an HF-insoluble fluoride salt upon reaction with a fluorinating reagent. The same ratio of metal salt to grog should be employed, as well as the same level of aqueous paste-forming liquid to form the cementitious paste of the grog and metal salt.

The HF-insoluble fluoride salt can be formed in the mortar composition before the mortar is applied to bond the refractory bricks into a brickwork unit by including in the paste-forming liquid a fluorinating reagent capable of reacting with the metal salt such as gypsum to form an HF-insoluble fluoride salt, such as $CaF_2$. Such reagents include HF, $NH_4F$, $NH_4HF_2$, and the like. The concentration of the fluorinating reagent in the paste-forming liquid solution preferably ranges between about 0% and about 40% by weight.

Otherwise, the refractory brick may be bonded into a brickwork unit, which can then be exposed to a fluorinating reagent capable of reacting with the metal salts such as gypsum to form an HF-insoluble fluoride salt in situ.

For example, a refractory brickwork unit can be constructed lining an HF reactor using a mortar having a binding phase containing only metal salts such as gypsum capable of forming HF-insoluble fluoride salts. Commercial operation of the reactor will expose the mortar to HF, which is a fluorinating reagent capable of reacting with the metal salt to form an HF-insoluble fluoride salt. In this manner, a HF-resistant ceramic mortar can be formed in situ in the brickwork unit lining the reactor.

The ceramic mortar compositions of the present invention may optionally include a viscous sintering vehicle. Typically, this is an HF-resistant thermoplastic polymer selected to improve the adherence between the mortar and the refractory bricks and to reduce the permeability of the mortar at high temperature. Essentially any HF-resistant thermoplastic polymer may be used, which can be readily identified by those of ordinary skill in the art without undue experimentation. The preferred HF-resistant polymer is TEFLON PFA TE, a perfluoroalkoxy copolymer, although, depending upon the temperature at which the mortar will be used, TEFLON FEP (a fluorinated ethylene propylene copolymer), polyethylene or polypropylene may also be used. As an alternative to organic thermoplastic polymers, an HF-resistant inorganic fluoride glass may also be used for very high temperature applications.

Refractory bricks bonded with ceramic mortars containing HF-resistant polymers must then be sintered at temperatures at which viscous flow of the mortar will occur. Those of ordinary skill in the art will understand "viscous flow" to mean that the polymer-containing mortar should become sufficiently fluid to cause a reduction of the total interfacial energy in the mortar system resulting in flow of the mortar into voids in the refractory brick via capillary forces (surface tension). The grog and binder morphology and particle sizes should be selected to promote viscous flow, which can be readily selected by those of ordinary skill in the art without undue experimentation.

Polymers should be chosen having a decomposition temperature sufficiently above the maximum temperature at which the brickwork unit assembled from refractory brick and mortar is expected to be exposed, so that the polymer phase retains its full bonding strength. This will typically require the use of a PFA TE having a decomposition temperature greater than about 300° C., and preferably greater than 400° C.

The polymer will typically be used in powder form. The polymer powder particle size is not as critical as the grog particle size, and may be selected merely to permit effective bonding of the refractory brick prior to the step of sintering the mortar, which will eliminate discrete particles of polymer and significantly increase the mortar bond strength to the level required for the resulting brickwork unit. However, the polymer particle size distribution may also be selected to impart plasticity to the mortar composition. Aqueous powder polymer suspensions may also be used. The aqueous phase of the suspension will function as a paste-forming liquid in the mortar composition. Thus, the amount of liquid contributed by the polymer suspension should be considered when determining the quantity of other paste-forming liquids to be added to the mortar composition.

The methods by which the mortar compositions of the present invention are mixed, and by which brickwork units are assembled therefrom are essentially conventional and well understood by those of ordinary skill in the art. Methods by which HF reactors are lined with refractory brickwork units are also essentially conventional and well understood.

The mortar compositions described above permit the preparation of HF-resistant refractory brickwork linings for HF reactors. This represents a significant improvement over prior art techniques for lining HF reactors.

The following non-limiting examples set forth hereinbelow illustrate certain aspects of the present invention. They are not to be considered limiting as to the scope and nature of the present invention. In the examples which follow, all parts are by weight. Temperatures are expressed in degrees Celsius.

EXAMPLES

Example 1

Chemical Durability of Calcium Sulfate

Five grams of calcium sulfate (U.S. Gypsum, Chicago, Ill.) was submerged in 100 mL of a 38.3 weight percent aqueous HF solution (Fisher Scientific, Fair Lawn, N.J.) at 90° C. for three days. Subsequently, the sample was water-washed by three times submersion in 100 mL of water for ten minutes prior to drying at 100° C. for one day. The changes in phase and weight of sample after fluorination was determined by an x-ray diffractometer (XRD) scanned from $2\theta=4-60°$ using a step size of 0.05° $2\theta$ and measuring time of one second per step. Changes in phase and weight were also confirmed by thermogravimetric analyzer (TGA) utilizing a heating rate of 20° C./min. to a final temperature of 700 or 900° C. in an air atmosphere with a flow rate of 55 mL/min.

For calcium sulfate, after HF fluorination at 90° C. for three days, XRD revealed a phase change from $CaSO_4$ to $CaF_2$. Theoretical weight loss from phase transformation is 41.4 weight percent, which was agreed to by 43 weight percent obtained experimentally. To examine the chemical durability of $CaF_2$ in the aqueous HF solution, the fluorinated gypsum was then re-subjected to the HF durability test. Weight loss of the $CaF_2$ in the HF solution was less than one weight percent after three days. TGA showed only five percent weight loss upon heat treatment of fluorinated gypsum at around 300–400° C. This demonstrates the suitability of gypsum as a binding phase for HF-resistant ceramic mortar, and as a compound that can transform in situ to a product that is both stable in HF and to heating to elevated temperatures.

Example 2

Formulation of Gypsum Mortar

A cementitious paste was prepared using a 2:1:1 ratio of gypsum to SiC grog (Lonza UF05, Lonza, Inc., Fair Lawn, N.J.) and water, based on 2.0 g of gypsum. Test samples were prepared by placing a 1 to 2 mm layer of mortar between two 1 cm×2 cm×0.5 cm Carblox P refractory brick coupons (ElectroChem Engineering & Mfg. Co., Emmaus, Pa.). The sample was allowed to air dry for one day and then dried in an oven at 90° C. for one day.

The sample was then submerged into the 38 percent aqueous HF solution at 90° C. and washed in water as described in Example 1. The sample was then air dried for one day, followed by drying in an oven at 90° C. for one day. The mortar composition showed good adherence to the refractory brick.

Examples 3–6

Effect of Grog Size on Adhesion

Mortar samples were prepared as in Example 2, using crushed Carblox P refractory brick as the grog. The grog was prepared by passing the crushed brick through various sizes of sieving screens to obtain the particle size distributions listed in Table I. The weight ratio of gypsum to grog to water is also shown in Table I. Bond samples were prepared with Carblox P refractory brick coupons as described in Example 2. The samples were then submerged in the 38% aqueous HF solution at 90° C. for three days, washed and dried as described in Example 2.

The mechanical strength of the bond interface was evaluated by a 3-point bending test on an Instron (Model 4505, Universal Testing Machine, Instron, Inc., Canton, Mass.) with a 0.6 in. span length and a cross head speed of 0.2 in./min. In this test, load was applied directly on the interface. The resulting interfacial bond strength in psi is shown in Table I.

TABLE I

| | Grog size (μm) | | | |
|---|---|---|---|---|
| | Example 3 >710 | Example 4 710–250 | Example 5 250–125 | Example 6 <125 |
| Gypsum | 2.0 | 2.0 | 2.0 | 2.0 |
| Carblox P | 1.0 | 1.0 | 1.0 | 1.0 |
| Water | 1.2 | 1.2 | 1.2 | 1.2 |

TABLE I-continued

| | Grog size (μm) | | | |
|---|---|---|---|---|
| | Example 3 >710 | Example 4 710–250 | Example 5 250–125 | Example 6 <125 |
| Adhesion to brick in 50% HF solution at 90° C. | Passed | Passed | Passed | Failed |
| Interfacial strength (psi) after drying at 100° C. | 0.96 | 5.31 | 5.18 | — |

The grog size showed a significant effect on the adhesion. For the mortar with the grog size smaller than 125 μm, the bond failed during immersion in the HF solution. The particle size distribution of this grog measured by sedimentation and light scattering techniques showed that the size distribution of the 125 μm grog was close to that of gypsum. However, for the mortar with the larger grog size (210–710 μm), the room temperature interfacial strength between mortar and bricks after fluorination and 100° C. drying was about 5 psi. The bond strength increased for larger grog particle sizes.

Examples 7–11

Effect of PFA TE on Interfacial Bond Strength

To improve the interfacial strength between mortar and brick, a fine-powder polymer was added to mortar compositions as a viscous sintering agent. The polymer employed was PFA TE (DuPont DeNemours, Inc. of Wilmington Del.). Mortar compositions were prepared as in Example 2 using gypsum, crushed Carblox P refractory brick having a particle size ranging between 250 and 710 μm and 38% aqueous HF solution and PFA TE in the weight ratios shown in Table II.

Bond samples were prepared with Carblox P refractory brick coupons as in Example 2. The samples were submerged in the aqueous HF solution at 90° C. for three days and then dried, as in Example 2. The bond strength of the samples was found to increase as PFA TE concentration increased.

The bond samples were then sintered at 330° C. with a heating rate of 100° C./hr. The samples were then held at 330° C. for 0.5 hour in an ambient atmosphere.

The mechanical strength of the bond interface was evaluated as in Examples 3–6. The room temperature interfacial strength of the bond samples was found again to increase as PFA TE concentration increased, as depicted in Table II.

TABLE II

|  | Weight Ratio | | | | |
| --- | --- | --- | --- | --- | --- |
|  | Example 7 | Example 8 | Example 9 | Example 10 | Example 11 |
| Gypsum | 2.0 | 2.0 | 2.0 | 2.0 | 2.0 |
| Carblox P (250–710 μm) | 1.0 | 1.0 | 1.0 | 1.0 | 1.0 |
| PFA TE | 0.0 | 0.2 | 0.4 | 0.6 | 0.8 |
| 38% aqueous HF solution | 1.2 | 1.2 | 1.2 | 1.2 | 1.2 |
| Adhesion to brick in HF solution at 90° C. | Passed | Passed | Passed | Passed | Passed |
| Interfacial strength (psi) after heat treatment at 330° C. | 5.31 | 24.89 | 51.75 | 63.64 | 157.26 |

The highest interfacial strength measured at room temperature was about 150 psi. The mortar had an apparent density of about 2.3 g/cc with a bulk density of 1.53 g/cc. The pore size distribution of the mortar fell into a 0.1–10 μm range. Thus, the room temperature interfacial strength between mortar and bricks was improved from 5 to 150 psi by adding PFA TE to the mortar and heating the sample to 330° C.

Example 12

Formulation of Calcium Fluoride Mortar with Water

Gypsum (calcium sulfate hemo-hydrate) was fluorinated prior to past formation. 34 grams of ammonium fluoride ($NH_4F$) were dissolved in 350 ml water. then, 40 grams of gypsum were added to the solution and the temperature was raised to 90° C. while stirring. Fluorination of gypsum to calcium fluoride ($CaF_2$) was completed within 5 hours under these conditions. Calcium fluoride powder, collected by filtration, was then washed with water and dried in an oven at 90° C. XRD indicated phase transformation from gypsum to $CaF_2$. Comparison of particle morphologies by scanning electron microscope revealed that the shapes of the $CaF_2$ particles resembled those of starting gypsum.

Calcium fluoride powder was sieved through a 80 mesh screen (<177 μm) prior to mixing with other ingredients. Mortar compositions were prepared as in Examples 7–11 using 2.5 parts by weight of $CaF_2$, one part by weight of crushed Carblox P brick having a particle size ranging between 250 and 710 μm, 0.8 parts by weight of fine powdered PFA TE. After well mixing the dry ingredients, two parts by weight of water were added to form a cementitious paste.

Bond samples were prepared with Carblox P refractory brick coupons as in Example 2. The samples were sintered at 330° C. with a heating rate of 100° C./hr. The samples were then subjected to HF adhesion test at 90° C. for three days as described in Example 2. The room temperature interfacial strength, evaluated as in Examples 3–6, ranged between 30 to 44 psi.

Examples 13–17

Formulation of Calcium Fluoride Mortar with Acetic Acid

Calcium fluoride was prepared using gypsum and ammonium fluoride as in Example 12. Mortar compositions were prepared as in Example 12. To form a cementitious paste, acetic acids with various concentrations (1–15 molar) were added. As shown in Table III, the amount of acetic acid ranged from 1.4 to 2.8 parts by weight.

Bond samples were prepared with Carblox P refractory brick coupons as described in Example 2. The samples were sintered, tested with respect to HF adhesion and interfacial strength as in Example 12. The interfacial strength increased from 8 psi to 36 psi with increasing concentration of acetic acid.

TABLE III

|  | Weight Ratio | | | | |
| --- | --- | --- | --- | --- | --- |
|  | Example 13 | Example 14 | Example 15 | Example 16 | Example 17 |
| $CaF_2$ (<177 μm) | 2.5 | 2.5 | 2.5 | 2.5 | 2.5 |
| Carblox P (710–250 μm) | 1.0 | 1.0 | 1.0 | 1.0 | 1.0 |
| PFA TE | 0.8 | 0.8 | 0.8 | 0.8 | 0.8 |
| Concentration of acetic acid (molar) | 1 | 5 | 10 | 13 | 15 |
| Acetic acid | 2.8 | 2.4 | 2.4 | 1.4 | 1.4 |
| Adhesion test in 38% HP at 90° C. | Failed | Failed | Passed | Passed | Passed |
| Interfacial strength (psi) | — | — | 8 | 13 | 36 |

Examples 18–19

Formulation of Calcium Fluoride Mortar with Acetic Acid

Calcium fluoride was prepared using gypsum and ammonium fluoride as in Example 12. Calcium fluoride was sieved through a 80 mesh screen (<177 μm) for Example 18 and a 170 mesh screen (<80 μm) for Example 19. Mortar compositions were prepared as in Example 12 using 2.5 parts by weight of $CaF_2$, 2.3 parts by weight of crushed Carblox P (710–250 μm), and 1.8 parts by weight fine-powdered PFA TE. To form a cementitious paste, 1.9 parts of acetic acid (15 molar) was added.

Bond samples were prepared in Carblox P refractory brick coupons as described in Example 2. The samples were sintered, tested with respect to HF adhesion and interfacial strength as in Example 12. The interfacial strength increased from 73 psi to 135 psi with decreasing $CaF_2$ particle size. The results were summarized in Table IV, where Example 17 was included for comparison.

TABLE IV

|  | Example 17 | Example 18 | Example 19 |
|---|---|---|---|
| Particle size of $CaF_2$ ($\mu$m) | 177 | 177 | 80 |
| $CaF_2$ | 2.5 | 2.5 | 2.5 |
| Carblox P (710–250 $\mu$m) | 1.0 | 2.3 | 2.3 |
| PFATE | 0.8 | 1.8 | 1.8 |
| Concentration of acetic acid (molar) | 15 | 15 | 15 |
| Acetic acid | 1.4 | 1.9 | 1.9 |
| Adhesion test in 38% HF at 90° C. | Passed | Passed | Passed |
| Interfacial strength (psi) | 36 | 73 | 135 |

As will now be readily appreciated, the present invention provides a method for preparing HF-resistant ceramic mortars suitable for bonding refractory brick into brickwork units for the lining of HF reactors. The compositions of the present invention are particularly advantageous because they can be prepared entirely from recycled waste streams. That is, compositions can be prepared using calcium sulfate from sulfate scrubbers, grog from used refractory brick and HF-resistant plastics from urban waste streams.

The foregoing description of the preferred embodiment should be taken as illustrating, rather than as limiting, the present invention as defined by the claims. Numerous variations and combinations of the features described above can be utilized without departing from the present invention.

What is claimed is:

1. A hydrofluoric acid (HF)-resistant ceramic mortar composition consisting essentially of a hydrofluoric acid-resistant grog having a particle size distribution imparting a high particle packing fraction to said mortar composition and selected from the group consisting of silicon carbide, alumina, carbon grog, HF-insoluble metal fluoride salts, metal salts that form HF-insoluble metal fluorides salts upon reaction with a fluorinating reagent and mixtures thereof, a binding phase consisting of a metal salt having a particle size distribution imparting plasticity to said mortar composition selected from the group consisting of HF-insoluble fluoride salts, metal salts that form HF-insoluble fluoride salts upon reaction with a fluorinating reagent, and mixtures thereof, and a paste-forming liquid present in an amount effective to form a cementitious paste of said grog and said binding phase, wherein said grog and said binding phase are present in a ratio of grog to binding phase between about 1:2.5 and 1:1.

2. The mortar composition of claim 1, wherein said binding phase metal salt is $CaF_2$.

3. The mortar composition of claim 1, wherein said paste-forming liquid is selected from the group consisting of water, alcohols, carboxylic acids, fluorinating reagents and mixtures thereof.

4. The mortar composition of claim 1, wherein said binding phase metal salt is selected from the group consisting of $CaCl_2$, $CaSO_4$ and $CaCO_3$.

5. The mortar composition of claim 1, wherein said paste-forming liquid is selected from the group consisting of water, alcohols, carboxylic acids, fluorinating reagents and mixtures thereof.

6. The mortar composition of claim 5, wherein said paste-forming liquid comprises a fluorinating reagent selected from the group consisting of HF, $NH_4F$ and $NH_4HF_2$.

7. The mortar composition of claim 1, further including an HF-resistant viscous thermoplastic polymeric vehicle.

8. The mortar composition of claim 7, wherein said viscous polymeric vehicle is selected from the group consisting of polyethylene, polypropylene, perfluoroalkoxy copolymers and fluorinated ethylene propylene copolymers.

9. The mortar composition of claim 8, wherein said viscous polymeric vehicle is a perfluoroalkoxy copolymer.

10. A brickwork unit comprising refractory brick bonded together by the ceramic mortar of claim 1.

11. A method for forming HF-resistant ceramic mortars comprising the steps of:

preparing a first ceramic mortar composition consisting essentially of an HF-resistant grog having a particle size distribution imparting a high particle packing fraction to said mortar composition and selected from the group consisting of silicon carbide, alumina, carbon grog, HF-insoluble metal fluoride salts, metal salts that form an HF-insoluble fluoride salt upon reaction with a fluorinating reagent and mixtures thereof, and a binding phase consisting of a first metal salt having a particle size distribution imparting plasticity to said mortar composition that forms an HF-insoluble fluoride salt upon reaction with a fluorinating reagent, wherein said grog and said binding phase are present in a ratio of grog to binding phase between about 1:2.5 and about 1:1; and contacting said first ceramic mortar composition with a fluorinating reagent, so that said first metal salt forms an HF-insoluble fluoride salt in said mortar binding phase, thereby imparting HF-resistance to said mortar.

12. The method of claim 11, wherein said first metal salt is selected from the group consisting of $CaCl_2$, $CaSO_4$ and $CaCO_3$.

13. The method of claim 11, wherein said first mortar composition further comprises a paste-forming liquid in an amount effective to form a cementitious paste of said grog and said binding phase.

14. The method of claim 13, wherein said aqueous paste-forming liquid is selected from the group consisting of water, alcohols, carboxylic acids, fluorinating reagents and mixtures thereof.

15. The method of claim 11, wherein said contacting step comprises the step of contacting said first ceramic mortar composition with a paste-forming liquid comprising a fluorinating reagent and in an amount effective to form a cementitious paste of said grog and said binding phase.

16. The method of claim 15, wherein said fluorinating reagent is selected from the group consisting of HF, $NH_4F$ and $NH_4F_2$.

17. The method of claim 11, wherein said first mortar composition further comprises a viscous polymeric heating vehicle, and said method further includes the steps of binding together refractory bricks with said mortar composition to form a brickwork unit, and sintering said brickwork unit at a temperature at which viscous flow of said polymeric sintering vehicle will occur, thereby increasing the density of said mortar composition bonding said brickwork unit together.

18. The method of claim 17, wherein said viscous polymeric vehicle is selected from the group consisting of polyethylene, polypropylene, perfluoroalkoxy copolymers and fluorinated ethylene propylene copolymers.

19. The method of claim 18, wherein said viscous polymeric vehicle is a perfluoroalkoxy copolymer.

20. A method for bonding refractory brick into a brickwork unit comprising bonding refractory bricks with a cementitious paste of a first ceramic mortar consisting essentially of an HF-resistant grog having a particle size distribution imparting a high particle packing fraction to said mortar composition and selected from the group consisting of silicon carbide, alumina, carbon grog, HF-insoluble metal fluoride salts, metal salts that form HF-insoluble metal fluoride salts upon reaction with a fluorinating reagent and mixtures thereof, a binding phase consisting of a metal salt having a particle size distribution imparting plasticity to said mortar composition selected from the group consisting of HF-insoluble fluoride salts, metal salts that form HF-insoluble fluoride salts upon reaction with a fluorinating reagent and mixtures thereof, wherein said grog and said binding phase are present in a ratio of grog to binding phase between about 1:2.5 and about 1:1, and a paste-forming liquid in an amount effective to form a cementitious phase of said grog and said binding phase, so that said refractory bricks form a brickwork unit.

21. The method of claim 20, wherein said binding phase metal salt is $CaF_2$.

22. The method of claim 20, wherein said paste-forming liquid is selected from the group consisting of water, alcohols, carboxylic acids, fluorinating reagents and mixtures thereof.

23. The method of claim 20, wherein said binding phase metal salt is selected from the group consisting of $CaSO_4$, $CaCl_2$ and $CaCO_3$.

24. The method of claim 23, wherein said aqueous paste-forming liquid further comprises a fluorinating reagent, so that an HF-insoluble fluoride salt is formed in said mortar binding phase, thereby imparting HF-resistance to said mortar composition before said composition is used to bond said refractory bricks into said brickwork unit.

25. The method of claim 24, wherein said fluorinating reagent is selected from the group consisting of HF, $NH_4F$ and $NH_4HF_2$.

26. The method of claim 23, wherein said method further includes the step of exposing said brickwork unit to a fluorinating reagent, so that an HF-insoluble fluoride salt is formed in said mortar of said brickwork unit, thereby imparting HF-resistance thereto.

27. The method of claim 20, wherein said first ceramic mortar composition further comprises a viscous thermoplastic polymeric vehicle and said method further includes the step of sintering said brickwork unit at a temperature at which viscous flow of said polymeric sintering vehicle will occur, thereby increasing the density of said mortar composition bonding said brickwork unit together.

28. The method of claim 27, wherein said viscous polymeric vehicle is selected from the group consisting of polyethylene, polypropylene, perfluoroalkoxy copolymers and fluorinated ethylene propylene copolymers.

29. The method of claim 28, wherein said viscous polymeric vehicle is a perfluoroalkoxy copolymer.

30. A brickwork unit prepared by the method of claim 20.

31. The mortar composition of claim 1, wherein said hydrofluoric acid-resistant grog is formed by crushing HF-inert refractory brick.

32. The method of claim 11, wherein said hydrofluoric acid-resistant grog is formed by crushing HF-inert refractory brick.

33. The method of claim 20, wherein said hydrofluoric acid-resistant grog is formed by crushing HF-inert refractory brick.

* * * * *

UNITED STATES PATENT AND TRADEMARK OFFICE
CERTIFICATE OF CORRECTION

PATENT NO.   : 5,932,505                                           Page 1 of 1
DATED        : August 3, 1999
INVENTOR(S)  : Richard E. Riman; Jakinee Eamsiri; Kurt Richard Mikeska; Yong Han It is certified that error appears in the above-identified patent and that said Letters Patent is hereby corrected as shown below:

Claim 1,
Line 40, insert -- and -- between "thereof," and "a".
Lines 46-48, delete "and a paste-forming liquid present in an amount effective to form a cementitious paste of said grog and said binding phase,".

Claim 3,
Line 53, delete "wherein said".
Line 54, delete "is".
Line 54, insert -- further comprising a -- between "claim 1," and "paste-forming" and insert -- present in an amount effective to form a cementitious paste of said grog and said binding phase, and -- between "liquid" and "selected".

Claim 5,
Line 60, delete "wherein said".
Line 61, insert -- further comprising a -- between "claim 1," and "paste-forming".
Line 61, delete "is".
Line 61, insert -- present in an amount effective to form a cementitious paste of said grog and said binding phase, and between "liquid" and "selected".

Column 17,
Line 52, insert -- thermoplastic -- between "viscous" and "polymeric" and delete "heating".
Line 55, delete "sintering" and insert -- heating -- therefor.

Signed and Sealed this

Twenty-second Day of January, 2002

*Attest:*

*Attesting Officer*

JAMES E. ROGAN
*Director of the United States Patent and Trademark Office*